United States Patent [19]
Wang

[11] 3,988,245
[45] Oct. 26, 1976

[54] ANISOTROPIC POLYVINYL FORMAL RESIN MICROPOROUS MEMBRANE AND ITS PREPARATION

[75] Inventor: Donald G. J. Wang, Waukesha, Wis.

[73] Assignee: Aqua-Chem, Inc., Milwaukee, Wis.

[22] Filed: June 13, 1974

[21] Appl. No.: 478,848

Related U.S. Application Data

[63] Continuation-in-part of Ser. No. 178,407, Sept. 7, 1971, abandoned.

[52] U.S. Cl. ................. 210/500 M; 210/23 F; 264/41; 264/46.8; 264/216
[51] Int. Cl.² ............ B01D 31/00; B01D 39/16; B29D 27/04
[58] Field of Search ............... 264/41, 49, 46–48, 264/216; 210/500 M, 23 F; 260/33.4

[56] References Cited
UNITED STATES PATENTS

| | | | |
|---|---|---|---|
| 2,308,530 | 1/1943 | McManus | 260/33.4 X |
| 3,276,996 | 10/1966 | Lazare | 264/49 X |
| 3,332,894 | 7/1967 | Cantor et al. | 264/41 X |
| 3,455,773 | 7/1969 | Tessier | 264/49 UX |
| 3,663,470 | 5/1972 | Nishimura et al. | 264/41 UX |
| 3,673,125 | 6/1972 | Takahashi et al. | 264/41 UX |
| 3,709,774 | 1/1973 | Kimura | 210/500 M X |
| 3,737,045 | 6/1973 | Hashimoto et al. | 210/500 M X |
| 3,789,993 | 2/1974 | Brown et al. | 210/500 M |
| 3,847,822 | 11/1974 | Shuey | 210/500 M |
| 3,852,388 | 12/1974 | Kimura | 210/500 M X |
| 3,933,653 | 1/1976 | Hashino et al. | 264/41 X |

OTHER PUBLICATIONS

Fitzhugh, Andrew F.; Edward Lavin and George O. Morrison, "The Manufacture, Properties, and Uses of Polyvinyl Formal", in the Journal of the Electrochemical Society, Aug. 1953, pp. 350–355.
Amicon Corp. Advertising Brochure: "Diaflo Ultrafilters", Diaflo Hollow Fibers.
Michaels, A. S. "New Separation Technique for the CPI", in Chemical Engineering Progress, vol. 64, No. 12, Dec. 1968, pp. 31–43.
Encyclopedia of Polymer Science and Technology, vol. 14, Section: "Poly(Vinyl/acetals)", New York, Interscience, c 1971, pp. 208–239.

Primary Examiner—Philip Anderson

[57] ABSTRACT

A microporous membrane having a thin surface skin and a cellular body is described. The membrane is effective for separating soluble oils, proteins and other substances having large molecular weights from water or other carriers by means of the ultrafiltration process or for removing salts from liquids by means of the electrodialysis process.

18 Claims, 4 Drawing Figures

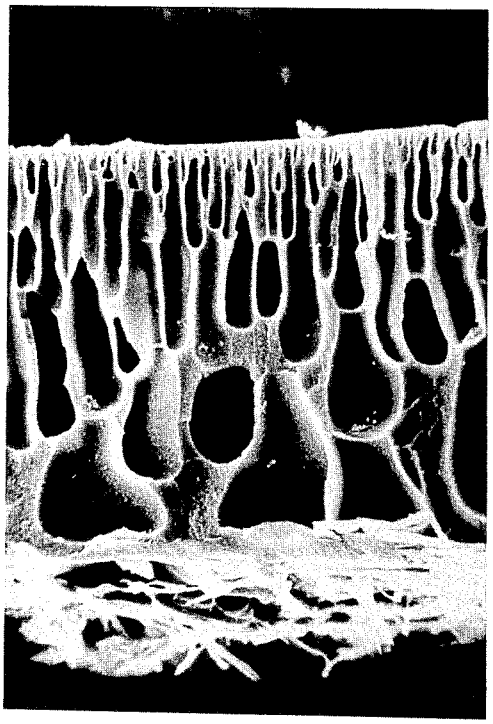
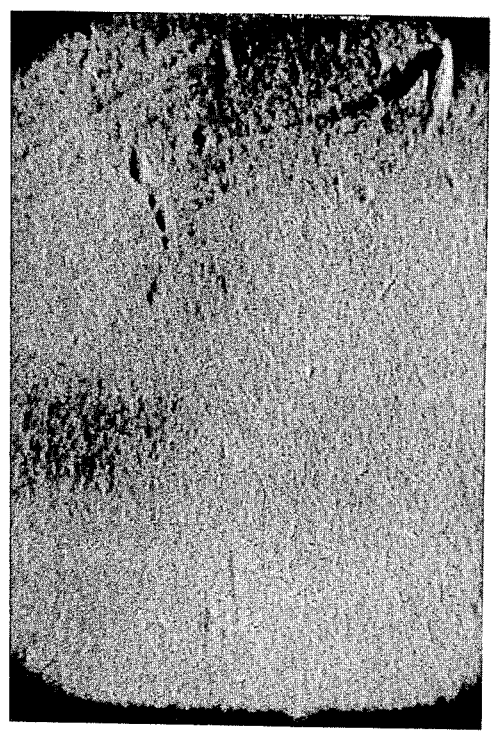
FIG. 1                          FIG. 2

ANISOTROPIC POLYVINYL FORMAL RESIN MICROPOROUS MEMBRANE AND ITS PREPARATION

BACKGROUND OF THE INVENTION

This application is a continuation-in-part of U.S. Application Ser. No. 178,407 entitled "Polyvinyl Acetal Membrane" filed Sept. 7, 1971 and now abandoned.

A variety of membranes are now being used in ultrafiltration and electrodialysis for selectively separating large molecules, ions and suspended particles from carrier fluids. Such membranes should preferably be tough, easy to cast, resistant to acids, bases, heat and other chemical or processing conditions which are normally encountered. In addition, such membranes must possess pore size selectivity so that certain substances can be filtered out of a solution or suspension while the carrier fluid can pass relatively unhindered through the membrane.

Membranes of the type here under consideration may be used as ultrafilters for separating proteins and other comparatively large molecules from water or other carriers. An example is the separation of proteins from whey, a by-product of the cheese industry, Disposal of cheese whey is becoming an increasingly difficult problem for cheese makers as whey has an extremely high BOD and the discharge of whey onto fields or into ditches, streams or lakes cannot be tolerated. By mounting membranes on porous supports and feeding raw whey under pressure against the membranes, a permeate consisting of water, lactose and small ions can be collected, while proteins are rejected by the membranes and can be collected for use in animal food enhancers or human food products.

Another use of such membranes can be illustrated in connection with cheese whey. Whey contains a relatively large amount of dissolved undesirable ions which can be removed from whey by an electric field. A cell is provided having membrane walls that are permeable to anions or cations (or both) and an electric field is supplied across the cell. Under the influence of the electric field ions will penetrate the membranes toward the oppositely charged electrode, leaving a demineralized product.

Another use of such membranes is in the ultrafiltration of suspended oils, such as the so-called water-soluble oils which are found in the effluents of plants which employ such oils as coolants for high speed automatic metal cutting machines.

SUMMARY OF THE INVENTION

An object of the present invention is to provide microporous membranes which are chemically inert, tough, abrasion-resistant and susceptible to pore size control so as to be useful in a variety of filter applications.

Another object of the invention is to provide a new membrane material which may alternatively be used as ultrafilters or neutral membranes in electrodialysis apparatus.

More specifically, it is an object of this invention to provide new membranes in the general class of polyvinyl acetal membranes, more particularly polyvinyl formal membranes.

Briefly stated, the invention includes preparing a microporous membrane by dissolving an appropriate amount of a selected polyvinyl acetal in a first solvent and forming therefrom a thin coating of the resulting solution on a substrate by conventional methods such as dip coating, flow coating or doctor blade coating. After allowing partial evaporation of the solvent from the coating, the coated substrate is immersed in a leaching liquid which is a solvent for the first solvent but in which the resin itself is not significantly soluble. Additional processing steps can produce final membranes having differing molecular weight rejection capabilities. The resultant membranes have a very thin surface skin, while the remainder of the membrane is cellular in structure with the cells gradually increasing in size from the skin to the supporting substrate. The individual cells of the membrane are supported by porous walls extending throughout the membrane's thickness.

How the foregoing and other more specific objects of the invention are achieved will appear from time to time throughout the course of the following description taken in conjunction with the several photomicrographs.

DESCRIPTION OF THE DRAWINGS

FIG. 1 is a scanning electron photomicrograph showing in cross section and at a magnification of 200X an illustrative membrane of the present invention;

FIG. 2 is a scanning electron photomicrograph showing the surface skin of the membrane shown in FIG. 1 at a magnification of 10,000X;

DESCRIPTION OF THE PREFERRED EMBODIMENTS

Figure 3:
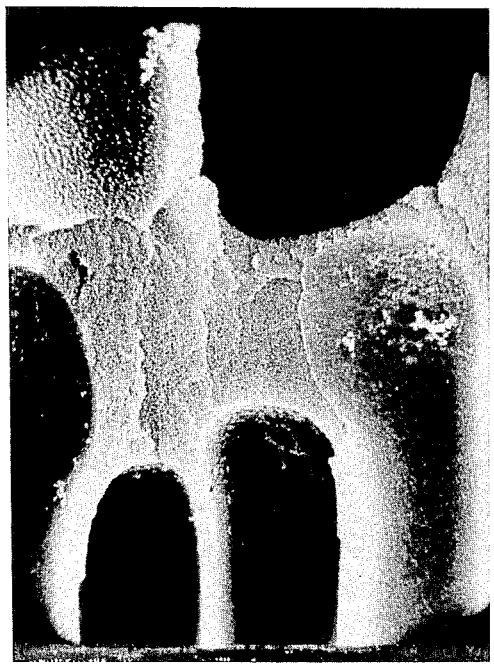
FIG. 3 is a scanning electron photomicrograph at a magnification of 1,000X showing a portion of the cells and porous support channels at an intermedite depth of the membrane shown in FIG. 1.

Materials required for preparing membranes according to the present invention include suitable polyvinyl acetal resins and a set of compatible solvents. Preferred polyvinyl acetals are polyvinyl formals which are prepared by reacting formaldehyde with polyvinyl alcohols, the latter being in turn prepared by the hydrolysis of polyvinyl acetate. The conditions of reaction of formaldehyde and polyvinyl alcohol (usually containing some acetate groups) and the relative proportions can be varied to produce a wide variety of synthetic resins having different proportions of acetal, alcohol and acetate groups randomly distributed along the molecular chain. Polyvinyl formals are preferred since they form durable films which are practically insoluble in many solvents and are unaffected by many contaminants which are commonly encountered in fluid purification jobs.

FORMVAR resins which are commercially available from Monsanto Polymers and Petrochemicals Company are suitable for use in the present invention. Such resins are identified by the trademark FORMVAR and a two digit numerical suffix, such as 12/85. The first number represents the viscosity of a 1000 ml benzene solution containing 86 grams of polyvinyl acetal at 20° C, while the second number represents the percentage of acetate groups which have been replaced by either alcohol or formal groups. Set forth below is a table showing three suitable FORMVAR resins and some of their chemical properties.

TABLE 1

| PROPERTY | FORMVAR 12/85 | FORMVAR 7/95E | FORMVAR 15/95E |
| --- | --- | --- | --- |
| Molecular weight (Wt. average) | 26,000–34,000 | 16,000–20,000 | 24,000–40,000 |
| Hydroxyl Content (expressed as % polyvinyl alcohol) | 5.5–7.0 | 5.0–6.5 | 5.0–6.0 |
| Acetate Content (expressed as % polyvinyl acetate) | 22–30 | 9.5–13.0 | 9.5–13.0 |
| Formal Content (expressed as % polyvinyl formal, approx.) | 68 | 82 | 82 |

Other FORMVAR resins are available from Monsanto, generally having molecular weights ranging between 10,000 to 44,000, hydroxyl contents ranging from 5.0–9.0, acetate contents ranging from 9.5–30 and formal contents ranging from 68-82. A more complete description of such FORMVAR resins is contained in publication No. 6070 of the Monsanto Polymers and Petrochemicals Company, published in 1967. In addition to the FORMVAR resins, polyvinyl formal resins are also commercially available from other sources.

A wide variety of solvent pairs may be employed to prepare membranes using the class of resins described above. Preferred initial coating solvents are dimethylsulfoxide, N-N-dimethylformamide and N-N-dimethylacetamide because these solvents will dissolve high percentages of polyvinyl formal resins at room temperature and because they are themselves soluble in water, the preferred leaching agent. Preferred initial coating compositions include between about 10 to about 20 percent resin and between about 90 and about 80 percent of the selected solvent. The composition ranges may be varied somewhat outside of these ranges depending on the thickness of the membrane, the desired final porosity, etc.

The second or leaching solvent used to prepare membranes according to the present invention must be selected from those liquids which will dissolve the initial solvent but which will not substantially dissolve the polyvinyl formal resin. Water is the most common leaching agent, but small amounts of compatible organic liquids can be added if desired. Likewise, solution modifiers may be added to regulate the viscosity or other properties of the coating dope or leaching agent and a selection of appropriate solution modifiers can readily be made by those skilled in the coating art.

The method of preparing membranes according to the present invention can be summarized as follows:

1. Prepare a casting dope according to the foregoing description (allowing the dope to stand for up to 24 hours or so can improve the reproducibility of the final membranes);
2. Cast a layer of the dope onto a suitable support to a wet thickness of from about 10 to about 40 mils using known coating techniques such as doctor blading, flow coating, dip coating, etc. (the substrate may be glass or metal if a self-supporting film is desired, or a porous material such as paper, fabrics or felts if a supported membrane is desired);
3. Allow the cast film to partially evaporate at room temperature for a finite period of time (as little as 5 seconds is suitable although the time may be 10 minutes or more);
4. Immerse the coated substrate in a bath of leaching liquid to dissolve out the initial solvent and form the microporous membrane (an immersion time of between 30 minutes and one hour at 15°–25° C has been found suitable, althogh again these parameters can be varied);
5. Optional, if decreased pore sizes are desired, the membrane can be dried at room or elevated temperatures (larger pore sizes can be preserved by keeping the membrane moist following leaching).

An additional method of reducing the pore size of the final membrane comprises immersing the membrane in a sodium hydroxide solution. This method is particularly effective if the initial resin has a high acetate content because the basic solution will hydrolyze the acetate group and render the membrane more permeable to water. Heating or drying to reduce pore size may be accomplished at between 40°–100° C with hot air, steam, etc.

EXAMPLE 1

A membrane especially suitable for whey protein concentration is made from a casting dope comprising 14.1–14.4% by weight of FORMVAR 15/95E in 85.9–85.6% by weight N-N-dimethylformamide. The casting dope was allowed to stand between 8 and 24 hours prior to coating. A film of between 20–30 mils is cast onto paper, allowed to dry for less than 15 seconds and immersed into water at 20° C for in excess of 1 hour. Drying at room temperature reduces the membrane pore size and water permeability.

EXAMPLES 2–10

The following membranes were also prepared.

| Membrane | Composition FORMVAR Resin-Solvent | Evaporation Time | Wet Thickness | Immersion Temp. |
| --- | --- | --- | --- | --- |
| 2 | 17.4% 7/95E, 82.6% DMF | 10 ± 5 sec. | 24 mils | 15° C |
| 3 | 17.4% 7/95E, 82.6% DMF | 10 min. | 24 mils | 15° C |
| 4 | 17.4% 7/95E, 82.6% DMF | 10 ± 5 sec. | 24 mils | 15° C |
| 5 | 17.4% 7/95E, 82.6% DMF | 10 ± 5 sec. | 12 mils | 15° C |
| 6 | 17.4% 7/95E, 82.6% DMF | 10 ± 5 sec. | 42 mils | 15° C |
| 7 | 25% 7/95E, 75% DMF | 10 ± 5 sec. | 24 mils | 15° C |
| 8 | 10% 7/95E, 90% DMF | 10 ± sec. | 24 mils | 15° C |
| 9 | 17.4% 7/95E, 82.6% DMF | 10 ± 5 sec. | 24 mils | 0° C |
| 10 | 17.4% 7/95E, 82.6% DMF | 10 ± 5 sec. | 24 mils | 30° C |

Membranes prepared according to the present invention are particularly water-permeable. Generally, membranes which were dried prior to use transmitted pure water used for testing at rates of up to 100 U.S. gallons per square foot per day at 15–19 pounds per square inch pressure. Under similar conditions, membranes which were not permitted to dry transmitted water at rates up to 500 gallons per square foot per day. When used as an ultrafilter for cheese whey, the permeability, of course, was reduced but transmissions of close to 60 gallons per square foot per day of permeate have still been observed. In the latter experiments a clear permeate was obtained and a high percentage of protein was rejected. These experiments indicate that the membranes disclosed herein will be useful in a wide variety of processes wherein rejection of molecules or ions having molecular weights in the range of approximately 10,000–30,000 is required. As previously described, the capabilities of the membranes can be extensively varied by control of process parameters. The following tables further demonstrate the functional characteristics of membranes 3–10 prepared in Examples 3–10.

TABLE II

| Membrane | Velocity ft/sec | PURE WATER Flux at 25° C in gal/ft²/day at 20 psi | 40 psi |
|---|---|---|---|
| 3 | 2.5 | 85.5/82.4 | 133/129 |
| 4 | 2.5 | 114/110 | 168/157 |
| 5 | 2.5 | 204/180 | 192/168 |
| 6 | 2.5 | 42.2/42 | 78/4/76.1 |
| 7 | 2.5 | .98/.98 | 1.96/— |
| 8 | 2.5 | 368/180 | 306/— |
| 9 | 2.5 | 88.2/74.5 | 141/— |
| 10 | 2.5 | 104/92.2 | 176/— |

TABLE III

| Membrane | Velocity ft/sec | CHEESE WHEY FLUX at 33 psi, 25° C in gal/ft²/day after: 15–60 min. operation | 24 hr. operation |
|---|---|---|---|
| 3 | 6.5 | 33.3/33.7 | 34.4 |
| 4 | 6.5 | 38/38 | 32.5 |
| 5 | 6.5 | 33.3/32.5 | 24.7 |
| 6 | 6.5 | 40/38.8 | 34.3 |
| 7 | 6.5 | 1.96/1.96 | — |
| 8 | 6.5 | 40.4/36 | 28.6/25.9 |
| 9 | 6.5 | 58.8/53.5 | 40.3/31.3/35.6 |
| 10 | 6.5 | 37.6/37.6 | 36.5/36.1/33.3 |

The membranes described herein are suitable for removing salts from whey or similar solutions when employed in electrodialysis equipment. The general characteristics of this equipment are well-known and it will suffice here to say that electrodialysis equipment comprises a plurality of cells which are defined by alternate cation-permeable membranes of a type not herein discussed and neutral membranes. There was a series of five such cell pairs in the test equipment used. The neutral membranes were made in accordance with the materials and methods set forth above. The first cell of the electrodialyzer contained an electrode which was connected to the negative terminal of a d-c supply and a similar electrode in the last cell was connected to the positive terminal of the supply. Current density through the series of cells and the applied voltage were observed. With a test solution comprising whey having 36% total solids and 7–8% of ash, ash was effectively removed with a current density of about 20 milliamperes per centimeter and an applied voltage of 20–30 volts. The voltage drop across the electrodialyzer did not increase appreciably during the test, showing that impedance remained fairly constant and that the membrane was not being fouled.

Gel permeation chromatographic tests demonstrated that materials having a molecular weight of 30,000 or greater will not permeate the above-described membranes. Thus, they are useful for separating both protein from whey and for separating soluble oils or highly emulsified materials from water. Additional data are given below for separability tests which were run on both whey and soluble cutting oils. The membrane casting solution was 14.1% FORMVAR 15/95E, 85.9% DMF by weight. The data in Tables IV and V represent individual tests which were made for verification purposes. In the following tables the abbreviated captions which are not self-explanatory are: St. Whey for standard whey; LP-10 for another form of whey which is a product of Purity Electrochemical Company of Mayville, Wisconsin; NPN for non-protein nitrogen; p.s.i. for pounds per square inch; Flux, in terms of gallons of permeate passing through one square foot of membrane per day; Conc. Factor which is concentration factor expressed as the ratio of feed volume to concetration volume; and TOD which is the total oxygen demand of the permeate expressed as parts of oxygen needed to completely oxidize the residual organic materials in one million parts of permeate.

TABLE IV.

Membrane Performance

| Feed | Total Solids | Ash | NPN | Proteins | Lactose & Other |
|---|---|---|---|---|---|
| St. Whey (A) | 6.18 | .57 | .34 | .61 | 4.66 |
| St. Whey (B) | 6.18 | .57 | .34 | .61 | 4.66 |
| St. Whey (C) | 6.18 | .57 | .34 | .61 | 4.66 |
| Whey, LP-10 (D) | 20.28 | 1.88 | 1.16 | 4.88 | 12.36 |
| Whey, LP-10 (E) | 20.28 | 1.88 | 1.16 | 4.88 | 12.36 |
| Whey, LP-10 (F) | 20.28 | 1.88 | 1.16 | 4.88 | 12.36 |

Operating Condition

| Feed | Pressure, p.s.i. Inlet | Outlet | Temp. ° C | Flux gals/sq ft/day |
|---|---|---|---|---|
| St. Whey (A) | 19 | 15 | 29 | 10 |
| St. Whey (B) | 19 | 15 | 29 | 9 |
| St. Whey (C) | 17.5 | 15 | 24 | 6–9 |
| Whey, LP-10 (D) | 19 | 15 | 30 | 4–6 |
| Whey, LP-10 (E) | 19 | 15 | 30 | 4–6 |
| Whey, LP-10 (F) | 19 | 15 | 30 | 4–6 |

Permeate Composition, %

| Feed | Total Solids | Ash | NPN | Proteins | Lactose & Others |
|---|---|---|---|---|---|
| St. Whey (A) | 5.27 | .49 | .19 | 0 | 4.61 |
| St. Whey (B) | 5.29 | .46 | .20 | 0 | 4.63 |
| St. Whey (C) | 5.27 | .52 | .21 | .00 | 4.48 |
| Whey, LP-10 (D) | 13.39 | 1.12 | .79 | .22 | 11.26 |
| Whey, LP-10 (E) | 13.63 | .85 | .79 | .22 | 11.77 |
| Whey, LP-10 (F) | 13.70 | .93 | .79 | .20 | 11.79 |

TABLE V.

Membrane Performance

| Feed | Operating Conditions Pressure p.s.i. | Temp. ° C | Flux gals/ sq ft/day | Conc. Factor | TOD in Permeate, ppm |
|---|---|---|---|---|---|
| Soluble Oil | 15 | 22 | 590 | 10 | 60 |
| Waste Water | 15 | 22 | 550 | 20 | 60 |
| Soluble Oil | 15 | 22 | 380 | 10 | 60 |
| Waste Water | 15 | 22 | 200 | 21 | 60 |
| Soluble Oil | 15 | 22 | 140 | 10 | 60 |

TABLE V.-continued

| | Membrane Performance | | | | |
|---|---|---|---|---|---|
| | Operating Conditions | | | | TOD in |
| Feed | Pressure p.s.i. | Temp. °C | Flux gals/ sq ft/day | Conc. Factor | Permeate, ppm |
| Waste Water | | | | | |

Table IV shows the results of three verification tests run on each of two types of whey samples. Note the relatively small differences in the amounts of small molecule substances such as ash and lactose in the permeate as compared with the feed composition. Note also that the large protein molecules, representing 0.61% of the feed composition in one series of tests, were consistently reduced to zero or near zero percent in the permeate and that in the other series of tests the 4.88% of protein in the feed compositions was consistently reduced to 0.20-0.22% in the permeate.

Table V shows the results of tests run on five different samples of so-called water soluble oil in water. The oil/water samples were waste coolant from metal cutting machines. The so-called water soluble oil forms a relatively stable emulsion of oil droplets in water. The membrane is not permeable to such fine oil droplets but is permeable to water. Thus, water in amounts of 140 to 590 gallons per square foot of membrane per day permeated the membrane. The small amounts of oxidizable materials, namely 60 to 200 parts per million in the permeate are indicative of the effectiveness of the membrane in removing the oil which is normally difficult to separate with prior art methods and apparatus.

While the structure and operation of membranes prepared according to the present invention are not fully understood, an explanation is suggested by the membrane structure which is illustrated in FIGS. 1-4 which are photomicrographs. FIG. 1 shows in cross section at a magnification of 200X, a membrane formed on a fabric backing using the composition of Example 2. The membrane comprises extremely thin surface skin on the side opposite fabric and an intermediate cellular structure which is relatively much thicker than skin. The individual cells of the cellular structure generally vary in size in relation to their distance from the skin with those cells immediately below the skin being relatively small while those adjacent the fabric being substantially larger in length and width with the intermediate cells also being generally intermediate in size. In addition, the major dimensions of the individual cells are oriented generally perpendicularly to the skin. The cellular structure just described provides a support for the relatively high pressures applied to the skin, e.g., 200 psi or more, as in the case of ultrafiltration. In the first instance, the predominantly normal orientation of the cell structure provides relative rigidity against pressure force applied in the opposite direction against the upper surface of the skin. Secondly, the smaller cell structure immediately below the skin minimizes the span area of the skin which is relatively unsupported between such vertical cell walls. In addition, the high pressure applied to the skin is distributed over a large number of supporting cells. The intermediate cells in turn provide support for the smaller skin cells, while the intermediate cells are supported on the much larger lower cells.

FIG. 1 also illustrates that the cells are generally larger in width and rounded on the ends thereof disposed away from skin. This facilitates flow inasmuch as fluid passing through skin and toward the fabric will be progressively moving into regions of generally decreasing total cell wall area. In addition, the generally tear-shaped configuration of the cells will minimize the tendency for material to collect in the cell structure.

FIG. 2 is a greatly magnified photomicrograph of the surface of the membrane shown in FIG. 1 and illustrates that even at 10,000X the pores at the surface are invisible. Other experiments have determined that the surface pores have an average size of between 70° A-120° A, but it should be understood that this range is in no way limiting because of the various process modifications outlined above. Such pore sizes, however, are adequate for effectively rejecting large molecular weight molecules while still providing sufficiently large openings for water to pass through the skin.

Figure 4:
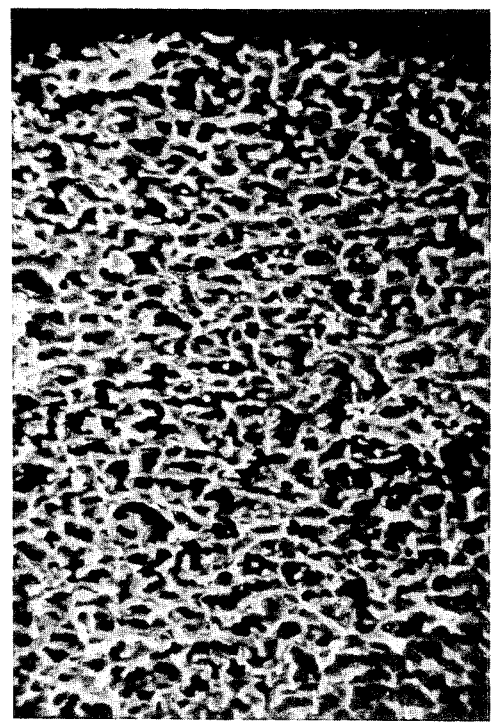
FIG. 4 is a scanning electron photomicrograph at a magnification of 10,000X of the porous support channels of the membrane of FIG. 1.

FIG. 3 shows a 1,000 magnification of the cellular walls located approximately midway between the skin and fabric backing, while FIG. 4 shows in still greater magnification (10,000X) a cross section of one of such walls. These FIGURES demonstrate that the walls are actually porous in nature, and that the pore sizes are greater than the surface pores, e.g., compare FIGS. 1 and 4 at the same magnification. This also minimizes the tendency for particles not rejected by the skin to clog the membrane internally during use. As a result, cleaning of the membranes by reversing the direction of flow through the membrane to remove any accumulated surface film of rejected materials is greatly facilitated.

The mechanism of permeate flow through the membrane is also not completely understood but it is hypothesized that after penetrating the surface skin permeate flows through interconnected cells or from one isolated cell to another through the porous cellular walls or by both means. The photomicrographs, of course, do not show the three dimensional relationships of the cells and walls and it has not been determined how many of the cells are actually interconnected to other cells. Once permeate passes the surface skin it is likely that it will follow the path of least resistance through the remainder of the membrane body, which would be through interconnected cells where possible.

The foregoing description of membranes, their method of preparation and modes of use should be taken as illustrative and the present invention is not to be limited thereby, but is only to be limited by the claims which follow.

I claim:
1. A method for preparing microporous membranes consisting essentially of the steps of
   a. preparing a casting dope consisting essentially of a polyvinyl formal resin dissolved in a solvent therefor,
   b. casting a film of said casting dope upon a support; and
   c. subsequently to said step of casting, immersing said film into a leaching liquid in which said solvent is soluble but in which said resin is substantially insoluble.

2. The method set forth in claim 1 wherein said polyvinyl formal resin has a molecular weight (wt. average) in the range of 10,000-44,000, an hydroxyl content of from 5.0-9.0% expressed as percent of polyvinyl alcohol, an acetate content of between 9.5-30% expressed as percent polyvinyl acetate and a formal content of between 68–82% expressed as percent polyvinyl formal.

3. The method set forth in claim 2 wherein said casting dope comprises between about 10 to about 20% of said resin and about 90 to about 80% of said solvent.

4. The method set forth in claim 3 wherein said solvent is selected from the group consisting of dimethylsulfoxide, N,N-dimethylformamide and N,N-dimethylacetamide and wherein said leaching liquid comprises water.

5. The method set forth in claim 4 wherein said casting dope is coated on said support to an initial film thickness of from about 10 to about 40 mils.

6. The method set forth in claim 5 including the additional and subsequent step of drying said membrane to reduce the pore size thereof.

7. The method set forth in claim 5 including the additional step of treating said membrane with an alkaline solution to reduce the pore size thereof.

8. A method for preparing microporous membranes comprising the steps of
   a. preparing a resin casting solution comprising from about 10 to about 20% of a polyvinyl formal resin selected from those polyvinyl resins having a molecular weight (wt. average) in the range of 10,000–40,000, a hydroxyl content of from 5.0–9.0% expressed as percent of polyvinyl alcohol, an acetate content of between 9.5–30% expressed as percent polyvinyl acetate and a formal content of between 68–82% expressed as percent polyvinyl formal and from about 90 to about 80% of a solvent selected from the group consisting of dimethylsulfoxide, N,N-dimethylformamide and N,N-dimethylacetamide,
   b. casting a film of said casting solution onto a support to an initial thickness of from about 10 to about 40 mils,
   c. allowing said cast film to dry in air for at least five seconds, and
   d. immersing said cast film into water for a time sufficient to leach substantially all of said solvent from said resin coating.

9. A microporous polymeric membrane prepared according to the process of claim 1.

10. A microporous polymeric membrane prepared according to the process of claim 6.

11. A microporous polymeric membrane prepared according to the process of claim 7.

12. A microporous polymeric membrane prepared according to the process of claim 8.

13. An amisotropic microporous polymeric membrane consisting essentially of a polyvinyl formal comprising:
   a. a microporous surface skin,
   b. a cellular support structure disposed below said skin and consisting of interconnected cell walls forming a first plurality of relatively small cells immediately below said skin surface, a second plurality of substantially larger cells on the side of said membrane opposite said skin and at least a third plurality of intermediate sized cells disposed therebetween, with the cell walls being more closely spaced in the area of said first plurality of cells than in the area of said second plurality of cells, at least said second and third plurality of cells being larger in width at the ends thereof displaced from said skin.

14. An anisotropic, polymeric microporous membrane consisting essentially of a polyvinyl formal resin and comprising:
   a. a microporous surface skin, and
   b. a cellular structure disposed beneath said skin body, said cellular structure comprising a plurality of generally elongated cells wherein the relative sizes of individual cells vary in relation to their distance from the surface skin with those cells most remote from said skin being relatively larger, said cells being arranged with their maximum dimension perpendicular to said surfaces and wherein the ends of said cells nearest said surface skin are generally narrower than the opposite ends thereof, and
   c. said polyvinyl formal resin being selected from those polyvinyl formal resins having a molecular weight (wt. average) in the range of 10,000–40,000, a hydroxyl content of from 5.0–9.0% expressed as percent of polyvinyl alcohol, an acetate content of between 9.5–30% expressed as percent polyvinyl acetate and a formal content of between 68–82% expressed as percent polyvinyl formal.

15. The membrane set forth in claim 14 wherein said membrane further includes a fibrous support adjacent the surface of said membrane opposite said surface skin, said support being selected from the group consisting of paper, fabrics and felted materials.

16. The membrane set forth in claim 14 wherein said cells are at least partially separated from one another by porous walls and wherein the pore size of said walls exceed the average pore size of said surface skin.

17. The membrane set forth in claim 14 wherein said pores of said surface skin have an average size of between about 70A and about 120A.

18. A microporous membrane consisting essentially of a polyvinyl formal resin and comprising:
   a. a microporous surface skin,
   b. a cellular support structure disposed below said skin and consisting of interconnected cell walls forming a first plurality of relatively small cells immediately below said skin surface, a second plurality of substantially larger cells on the side of said membrane opposite said skin and at least a third plurality of intermediate sized cells disposed therebetween, with the cell walls being more closely spaced in the area of said first plurality of cells than in the area of said second plurality of cells, at least said second and third plurality of cells being larger in width at the ends thereof displaced from said skin, and
   c. said polyvinyl formal resin being selected from those polyvinyl formal resins having a molecular weight (wt. average) in the range of 10,000–40,000, a hydroxyl content of from 5.0–9.0% expressed as percent of polyvinyl alcohol, an acetate content of between 9.5–30% expressed as percent polyvinyl acetate and a formal content of between 68–82% expressed as percent polyvinyl formal.

* * * * *

UNITED STATES PATENT OFFICE
CERTIFICATE OF CORRECTION

Patent No. 3,988,245             Dated    October 26, 1976

Inventor(s) Donald G. J. Wang

It is certified that error appears in the above-identified patent and that said Letters Patent are hereby corrected as shown below:

Column 9, claim 13, line 52, cancel "amisotropic" and substitute --anisotropic--; line 53, after "formal" insert --resin--.

Column 10, claim 17, line 38, cancel "70A and about 120A" and substitute --70°A and about 120°A--.

Signed and Sealed this

First Day of February 1977

[SEAL]

Attest:

RUTH C. MASON
*Attesting Officer*

C. MARSHALL DANN
*Commissioner of Patents and Trademarks*